United States Patent [19]

Yamaguchi et al.

[11] 4,024,098
[45] May 17, 1977

[54] REINFORCING COMPOSITION FOR MINERAL STRUCTURES

[75] Inventors: Tadashi Yamaguchi; Takayuki Ono, both of Sendai; Hiroshi Hoshi, Narashino; Michio Hirakawa; Isao Watanabe, both of Ickikawa, all of Japan

[73] Assignee: Mitsui Toatsu Kagaku Kabushiki Kaisha (Mitsui Toatsu Chemicals, Incorporated), Tokyo, Japan

[22] Filed: Aug. 13, 1975

[21] Appl. No.: 604,090

Related U.S. Application Data

[63] Continuation of Ser. No. 408,263, Oct. 23, 1973, abandoned.

[30] Foreign Application Priority Data

Oct. 23, 1972 Japan .............................. 47-105218
Feb. 3, 1973 Japan ............................... 48-13917

[52] U.S. Cl. ............... 260/29.6 MQ; 260/29.6 RB; 260/887; 260/874; 260/885; 260/901; 526/273; 526/291; 526/312; 526/317; 526/234; 526/324; 526/335; 526/336; 526/343; 526/344; 526/346; 526/341
[51] Int. Cl.$^2$ ................. C08L 33/08; C08L 33/10; C08L 37/00
[58] Field of Search ............. 260/29.6 MQ, 29.6 R; 526/234, 328, 273

[56] References Cited

UNITED STATES PATENTS 3,223,161 12/1965 Burge .................................. 166/33
3,223,162 12/1965 Burge .................................. 166/33

FOREIGN PATENTS OR APPLICATIONS 821,961 10/1959 United Kingdom

*Primary Examiner*—Harold D. Anderson
*Attorney, Agent, or Firm*—William J. Daniel

[57] ABSTRACT

A reinforcing composition for mineral structures which comprises as reactive ingredients one or more radical-polymerizable or copolymerizable monomer and a bisulfite ion-supplying substance. The use of the reinforcing composition facilitates reinforcement of natural or artificial mineral structures and products.

2 Claims, No Drawings

REINFORCING COMPOSITION FOR MINERAL STRUCTURES

This is a continuation of Ser. No. 408,263, filed Oct. 23, 1973, now abandoned.

BACKGROUND OF THE INVENTION

This invention relates to a novel reinforcing composition for reinforcing natural or artificial mineral structures such as natural structures made of rocks or minerals and artificial structures made of ceramics, artificial stones, concrete or mortar as well as the surface structures of the earth such as road surfaces or sloping surfaces. More particularly, this invention relates to a novel reinforcing composition and method that uses the mineral material per se to be reinforced as one of the polymerization initiating ingredients.

Hitherto, methods suggested for reinforcing shaped mineral products such as concrete block and ceramic products include a method wherein such shaped mineral products are impregnated with a monomer and irradiated by actinic rays to cause polymerization of the monomer, a method wherein such shaped mineral structures are impregnated with a monomer to which a radical-polymerization initiator has been added and then are heated to cause polymerization of the monomer, and like methods. As these methods require radiation by actinic rays or heating, however, the articles to be treated are limited in size according to the size of the treating apparatus and such methods are utterly inapplicable to reinforcement or repair of natural or artificial structures located in the field.

Earth strengthening agents composed predominantly of cement or sodium silicate are known in the art. In the case of the agents composed predominantly of cement, however, the cement particles contained therein cannot penetrate through layers of earth having voids smaller in diameter than the particles. Therefore, agents based on cement particles cannot be usefully applied to a layer of fine sand. In addition, the impossibility of controlling the hardening time of cement makes such agents unsuited for injection hardening of the earth where water springs or sand flows. On the other hand, in previous agents composed predominantly of sodium silicate, the sodium silicate must be present in high concentration to achieve good hardening of the earth and can undergo initiation of a rapid reaction to give too high viscosity to be applicable to strata of finely particulate sand. Further permeation and hardening of agents of the latter type is unpredictable because of natural variations in the earth, such as chemical composition, earth temperature or moisture content.

For treating sloping earth surface, some chemical grouts are known which contain urea resin or urethane resin as their base. However, these grouts are difficult to handle because of their high viscosity and are limited in the application to the earth depending on its nature.

Some earth stabilizing agents based on a water-soluble monomer such as an acrylic salt or acrylamide have been proposed heretofore to improve the above mentioned defects of chemical grouts based on urea or urethane resins. However, these stabilizing agents also have disadvantages; they require a Redox catalyst system that is difficult to prepare and their application is narrowly limited because the monomers that can be utilized are limited. Thus, there is a real need for earth treating agents that can overcome these defects and can be used widely for treating shaped mineral structures and earth surfaces.

BRIEF SUMMARY OF THE INVENTION

Accordingly, it is an object of this invention to provide a novel reinforcing composition easily applicable to mineral substances without the necessity for exposure to actinic radiation or heat.

It is another object of this invention to provide a novel reinforcing composition of a type that the mineral content of the structure to be reinforced is utilized as one of the radical-polymerization initiating ingredients so that the shaped mineral products or structures are reinforced by in situ polymerization of a monomer.

It is still another object of this invention to provide a method of effectively reinforcing mineral structures including natural structures such as the flat and sloping earth surfaces, etc. with the reinforcing composition in question.

Other objects, features and advantages of this invention will become apparent as the description proceeds.

DETAILED DESCRIPTION OF THE INVENTION

In accordance with this invention, the aforementioned objects can easily be attained by using a composition comprising as reactive ingredients a polymerizable or radical-copolymerizable monomer and a bisulfite ion ($HSO_3^-$)-supplying substance.

Radical-polymerizable or -copolymerizable monomers useful in the reinforcing composition of this invention are those capable of undergoing vinyl type addition polymerization in the presence of a radical-polymerization initiator. Examples of such monomers include unsaturated fatty acids such as acrylic acid and methacrylic acid as well as salts and esters thereof, unsaturated nitriles such as acrylonitrile and methacrylonitrile, unsaturated amides such as acrylamide and methacrylamide, halogenated olefins such as vinyl chloride and vinylidene chloride, styrenes such as styrene itself and $\alpha$-methylstyrene, dienes such as butadiene, isoprene and chloroprene, and bridging or cross-linking unsaturated compounds such as divinyl-benzene, glycidyl methacrylate and N-methylol acrylamide. These monomers may be used singly or in mixture of at least two.

Bisulfite ion-supplying substances utilizable in the reinforcing composition of this invention include, for example, sulfur dioxide, an aqueous solution of sulfurous acid, a combination system of a bisulfite or sulfite with an acid, a combination system of a hyposulfite with an acid, a combination system of dithionic acid or a salt thereof with an acid, a combination system of a polythionic acid or a salt thereof with an acid, and a combination system of a thiosulfate with an acid. The joint use of a peroxide known hitherto will cause no trouble.

Among these bisulfite ion-supplying substances, sulfur dioxide can be used directly by dissolving it in a vinyl monomer. The other ion-supplying substances are dissolved in water or an aqueous solvent to form a solution and conveniently used in the form of an emulsion with a vinyl monomer. Alcohols and ketones may be used as preferred solvents other than water.

In case the monomer is dispersed into these solvents, it is convenient to use an additive. Examples of such additive are dispersing agents such as polyvinyl alcohol and polyacrylamide, polyethyleneglycol alkyl ethers, alkylbenzenesulfonates and surfactants of amine type.

According to this invention, various reinforcing agents which are different in properties and permeability can be produced by properly selecting the type of monomer and solvent. For example, the use of such a monomer as vinyl acetate or methyl acrylate gives a relatively soft product while the use of methyl methacrylate or styrene gives a hard product. The use of a divinyl compound gives a product having high toughness.

It is possible to use an emulsion of polymers jointly with the reinforcing composition of this invention. Mentioned as such emulsion are emulsions of polyvinyl chloride, styrene-butadiene copolymer, polyvinyl acetate, polyacrylic esters, silicones and other various polymers and copolymers in water, alcohols and other liquids as emulsion media. The content of polymer in such emulsion is not particularly limited but is generally selected from the range of 5 – 70% by weight.

When a layer of sand is sprinkled with an emulsion of a polymer such as polyvinyl chloride or poly(methyl methacrylate), such emulsion will fail to form a continuous layer and give an unsatisfactory stabilizing effect because of its poor permeability. However, a similar polymer emulsion containing a vinyl monomer and a bisulfite ion-supplying substance is very superior in permeability to the emulsion of the polymer alone and forms a continuous layer by the polymerization of the monomer caused by the action of the inorganic (mineral) substance and the bisulfite ion, thus exhibiting a high earth stabilizing effect to a certain depth. It is one of the characteristic features of the composition of this invention that permeability can freely be controlled by appropriately selecting the quantities of polymer, monomer and solvent.

If desired, the composition of this invention may be incorporated with other substances, for example, manure, lignin, red mud, slug, asbestos and sand. In case a planting method is jointly desired, a mixture of the composition with seeds of plants may be applied. It is also possible to prepare separately an emulsion of a polymer and a mixture of a monomer and a bisulfite ion-supplying substance and injecting both at the same time at the place where the treatment is desired, thereby forming the mixture in situ on actual application.

The products to be reinforced with the composition of this invention include natural and artificial shaped articles made of mortar, cement paste, concrete, asbestos slate, asbestos cement element, gypsum, brick, ceramics, loam, rock, etc. The composition of this invention is especially suited for the repair of ancient or fired articles. The sort of articles to be treated is not particularly limited so long as the articles contain mineral substances.

In the case of structures, for example, concrete structures to be reinforced with the composition of this invention, the structures are preferably impregnated while they are still in the course of hardening with the reinforcing composition. In this case, cement particles or inorganic substances constituting skeleton particles in the structures are activated by interaction between water present in the structure and bisulfite ion present in the reinforcing composition, thereby initiating the polymerization reaction of the monomer. Thus, the inherent hardening reaction of cement with water takes place concurrently with the polymerization reaction of the monomer and the structures are reinforced by both these reactions. This competitive polymerization requires existence of both bisulfite ion and inorganic substances. Lack of either one will disturb smooth progress of the polymerization reaction.

The composition of this invention is conveniently applicable to not only said artificial structures but also natural formations such as rocks and cliffs. For instance, when such formations as rocks or cliffs form cracks, an aqueous slurry containing a monomer and bisulfite ion is mixed with a filler such as cement or fine sand and then injected into the cracks. The surface of cracks is then coated with a suitable film and left for about 2 days whereby the cracks are entirely repaired. The reinforcing composition of this invention is thus featured by the use of less expensive materials, easy preparation of the composition adaptable for various purposes and necessity for neither actinic radiation nor heating and therefore is suitable for repairing operations in a large scale.

Natural sandstone, marble (produced in Yugoslavia), Ohya ishi (one kind of tuff) and the like porous rocks can also be reinforced with the composition of this invention.

The reinforcing composition of this invention can also be applied to strengthening of earth surfaces.

In the reinforcing composition of this invention taking advantage of the polymerization reaction of a monomer in the concurrent presence of bisulfite ion and a mineral substance, lack of either one of the bisulfite ion and the mineral substance will, as stated hereinbefore, disturb the smooth progress of the polymerization reaction. The composition of this invention is quite different in this respect from known conventional earth strengthening agents of the acrylamide or acrylic salt series having a Redox catalyst incorporated thereinto which are capable of undergoing the polymerization reaction in the absence of earth. The composition of this invention, which is a liquid of low viscosity utilizing as one of its catalyst components inorganic substances per se constituting the earth and capable of promoting the polymerization reaction without the necessity of any peroxide initiator, can be applied to any place of the earth so long as there exists minerals containing iron oxides, aluminum oxide, silica, calcium salts, etc. For instance, the reinforcing composition of this invention can widely be utilized for preventing scattering of sand particles in desert or seashore areas, breaking of roads or slopes, scattering of industrial wastes and for maintenance of playground surfaces. The composition can be applied also to rocky ground containing a large amount of moisture.

Application of the composition of this invention is carried out according to any of the sprinkling method, injection method, mixing-in-place method and central plant system. The sprinkling method is suited for preventing scattering of sand particles on sandy ground and is carried out, for example, by sprinkling a mixture of a monomer and an aqueous solution of sulfurous acid incorporated, if necessary, with an additive, thereby coagulating sand particles in the form of blocks. In this case, the use of a composition larger in the monomer content and permeability attains stabilization of ground. The injection method is suited for solidification of ground and is carried out, for example, by introducing under pressure a composition made of a hydrophilic monomer into voids of sandy or rocky ground. In this case, the addition of a hydrophilic polymer which is insoluble in water but is swollen therewith serves to prevent permeation of water effectively since the polymer is swollen with water and clog voids. The mixing-in-place method is suitable for the stabilizing treatment of a road base or sloping surface and is carried out, for example, by sprinkling the strengthening composition on the road, mixing thereon the composition with soil and sand, pressing the mixture with a ram and then curing it. The central plant system is carried out by preparing a mixture of the composition containing a monomer and a bisulfite ion-supplying substance with soil, sand and other filler materials in a central plant, and conveying the mixture to a place where the treatment is desired, and then pressing and curing the mixture. The polymerization time and curing time in this case can freely be controlled by appropriately selecting the mixing conditions in the central plant. The application modes of the composition of this invention are not limited to those specifically mentioned above and any of the other conventional application means can be adopted.

This invention will be understood more readily with reference to the following examples. However, these examples are intended to illustrate this invention and are not to be construed to limit the scope of this invention.

EXAMPLE 1

A reinforcing composition was prepared by dissolving a given amount of sulfur dioxide in methyl methacrylate and/or methyl acrylate as monomer.

Shaped concrete samples manufactured from Portland cement (6 months elapsed after shaping; manufactured according to JIS A-1132) were impregnated with said reinforcing composition for 5 minutes and then allowed to stand in the open air to determine changes in strength.

The results of compression tests performed according to JIS A-1108 are shown in Table 1 wherein MMA and AM stand for methyl methacrylate and methyl acrylate, respectively.

Table 1

| Sample No. | Type of monomer | Monomer liquid composition | | Amount of monomer impregnated (% by wt.) | Curing time (day) | Compression strength (kg/cm$^2$) |
|---|---|---|---|---|---|---|
| | | Monomer (% by wt.) | SO$_2$ (% by wt.) | | | |
| 1 | — | — | — | — | — | 272 |
| 2 | MMA | 98 | 2 | 1.7 | 1 | 326 |
| " | " | " | " | " | 3 | 448 |
| " | " | " | " | " | 7 | 467 |
| 3 | MMA | 98 | 2 | 3.1 | 1 | 311 |
| " | " | " | " | 3.2 | 3 | 489 |
| " | " | " | " | 3.1 | 7 | 531 |
| 4 | MMA AM | 88 10 | 2.0 | 3.0 | 1 | 331 |
| " | MMA AM | " " | " | 3.3 | 3 | 465 |
| " | MMA AM | " " | " | 3.0 | 7 | 468 |

EXAMPLE 2

Reinforcing compositions were prepared by dissolving a given amount of sulfur dioxide in various kinds of monomers. Various rocks (not dried) were impregnated under normal pressure with the reinforcing compositions. After 10 hours, the rocks were removed and allowed to stand in the open air. After lapse of varying periods of time from initiation of impregnation, the rocks thus treated were subjected to compression tests according to JIS A-1108, the results being shown in Table 2 below.

In the table, MMA stands for methyl methacrylate, AM for methyl acrylate, St for styrene, AN for acrylonitrile, VAc for vinyl acetate and PBu for polybutadiene.

Table 2

| Sample | Type of sample | Monomer liquid composition | | | | Amount of monomer impregnated (% by wt.) | Curing time (day) | Compression strength (kg/cm$^2$) | Ratio of strength increase |
|---|---|---|---|---|---|---|---|---|---|
| | | Monomer (% by wt.) | | Additive (% by wt.) | | | | | |
| 1 | Tuff (Ohya ishi) | MMA | 96 | SO$_2$ | 4 | 13.2 | 21 | 673 | 2.3 |
| | " | MMA | 96 | SO$_2$ | 4 | 13.5 | 50 | 711 | 22.4 |
| 2 | " | AM MMA | 22 75 | SO$_2$ | 3 | 12.9 | 21 | 659 | 2.3 |
| 3 | " | S+ MMA | 22 75 | SO$_2$ | 3 | 12.7 | 21 | 650 | 2.2 |
| 4 | " | AN MMA | 22 70 | 0.1N H$_2$SO$_4$ SO$_2$ | 2 3 | 13.7 | 21 | 612 | 2.1 |
| 5 | " | VAC MMA | 22 75 | SO$_2$ | 3 | 13.3 | 21 | 583 | 2.0 |
| 6 | Kanto loam | MMA | 96 | SO$_2$ | 4 | 27.9 | 50 | 85 | 96 |
| 7 | Sandstone | MMA | 96 | SO$_2$ | 4 | 7.3 | 50 | 420 | 2.3 |
| 8 | Kanto loam | S+ MMA | 15 72 | PBu SO$_2$ | 10 3 | 25.5 | 50 | 73 | 65 |

EXAMPLE 3

A reinforcing composition was prepared by mixing 90 parts by weight of methyl methacrylate and 10 parts by weight of 2N-aqueous solution of sulfurous acid. Potash feldspar was finely divided into particles of 150 – 200 mesh, shaped under pressure of 300 kg/cm$^2$ into blocks (50 × 50 × 100 mm) and then impregnated at room temperature with said reinforced composition. The blocks thus treated were left for 2 days at room temperature and then tested to determine their bending strength, whereby it was found that the blocks had a bending strength of 235 kg/cm². The blocks had a monomer content of 35.3% by weight.

Similar blocks were prepared by using a mixture of 95 parts by weight of quartz in place of said potash feldspar and 5 parts by weight of calcium sulfite and treated in a similar manner whereby it was found that the blocks had a bending strength of 271 kg/cm². The blocks had a monomer content of 38.1% by weight.

EXAMPLE 4

| | |
|---|---|
| Potash feldspar (150 – 200 mesh) | 10.0 g |
| Methyl methacrylate | 4.5 g |

The above materials are placed in a 30 ml flask with a joint stopper and the potash feldspar was dispersed into the methyl methacrylate. An aqueous solution of sulfurous acid containing a given amount of sulfur dioxide was then added to the mixture and allowed to stand at room temperature to determine the time (days) required to increase the polymerization rate above 60%. The room temperature was kept at 25 ± 6° C during the test. The results of polymerization tests are shown in Table 3.

Table 3

| | Composition | | | | | Days to |
|---|---|---|---|---|---|---|
| Exp. No. | Potash feldspar (g) | MMA (g) | SO₂ or BPO (g) | H₂O (g) | SO₂/MMA ratio in composition | polym. >60% |
| 1 | 10.0 | 4.5 | BPO 0.09 | — | — | 10 |
| 2 | 10.0 | 4.5 | SO₂ 4.4×10⁻³ | 0.1 | 0.1/100 | |
| 3 | 10.0 | 4.5 | SO₂ 9.0×10⁻⁵ | 0.1 | 0.01/100 | 6 |
| 4 | 10.0 | 4.5 | SO₂ 9.0×10⁻⁵ | 0.1 | 0.001/100 | 9 |
| 5 | — | 4.5 | SO₂ 9.0×10⁻⁵ | 0.1 | 0.001/100 | 14 |

BPO: Benzoyl Peroxide
MMA: Methyl methacrylate

EXAMPLE 5

An emulsion was prepared by mixing 250 g of methyl methacrylate, 100 g of 0.5N aqueous solution of sulfurous acid and 0.45 g of polyethyleneglycol alkyl ether. The emulsion was then mixed with 2.70 kg of Toyoura standard sand and packed into a cylindrical mold of 10 cm in diameter and 12 cm in height. Four samples were prepared by pressing the mixture in three layers, with each layer being pressed 25 times by a 2.5 kg load ram. The samples were left for 24 hours at normal temperature and released from the mold. The samples were then left in the open air for 1 – 14 days and subjected to a one-axis compression test (stress control: 1 mm/minute). The results of test are shown in Table 4.

Table 4

| Sample No. | 1 | 2 | 3 | 4 |
|---|---|---|---|---|
| Curing time (day) | 1 | 3 | 7 | 14 |
| Compression strength $q\mu$ (kg/cm²) | 7 | 29 | 50 | 51 |

EXAMPLE 6

Twenty kilograms of an earth strengthening agent were prepared from 20 parts by weight of methyl methacrylate, 10 parts by weight of methacrylic acid and 70 parts by weight of 5% aqueous solution of sodium bisulfite and immediately injected into the ground (Kanto loam) through an iron nozzle inserted thereinto. After lapse of 7 days, the ground was dug to obtain about 80 liters of a lump of soil around the nozzle. The lump was cut into a cylindrical form of 10 cm in diameter and 12.7 cm in height and subjected to a one-axis compression test whereby the compression strength ($q\mu$) of the treated soil was determined as 51 kg/cm².

EXAMPLE 7

Emulsions of a variety of compositions were prepared by adding at room temperature methyl methacrylate, polyethyleneglycol alkyl ether (emulsifier) and other ingredients to 3% aqueous solution of sulfurous acid or 4.5% aqueous solution of sodium bisulfite and stirring the mixture for 5 minutes by the aid of a mixer of 3000 rpm. Within 1 minute after preparing the emulsions, they were evenly sprinkled onto nine sandy test areas each having an area of 1.0 m in longitudinal direction and 1.0 m in traverse direction (located in Fukiagehama, a reclaimed land in the suburbs of Shiogama shi, Miyagiken, Japan). When the temperature at a depth of 5.0 cm from the surface was measured, elevation of about 1.5° C was observed after 2 minutes.

After lapse of 10 days, the test areas were measured according to a Proctor penetration resistance test, the results being shown in Table 5. As is evident from the table, an inhibition effect to scattering of sand particles was attained by treatment with the emulsions.

Table 5

| | Exp. No. | 1 | 2 | 3 | 4 | 5 | 6 | 7* | 8* | 9 |
|---|---|---|---|---|---|---|---|---|---|---|
| Emulsifying liquid composition | Methyl methacrylate | 500 | 500 | 500 | 1000 | 1000 | 1000 | 250 | 250 | — |
| | 3% Aqueous solution of sulfrous acid | 1000 | — | 4500 | 2000 | — | 4500 | 4500 | — | — |
| | 4.5% Aqueous solution of sodium bisulfite | — | 1000 | — | — | 2000 | — | — | 4500 | — |

Table 5-continued

| | Exp. No. | 1 | 2 | 3 | 4 | 5 | 6 | 7* | 8* | 9 |
|---|---|---|---|---|---|---|---|---|---|---|
| (g) | Emulsifier | 3.0 | 3.0 | 3.0 | 3.0 | 3.0 | 3.0 | 3.0 | 3.0 | — |
| | Polyvinyl acetate | — | — | — | — | — | — | 250 | 250 | — |
| Results | Increase of temperature after sprinkling | 1.5 | 1.5 | 2.0 | 1.5 | 1.5 | 1.0 | 1.5 | 2.0 | — |
| | Load for 1/5" diam. needle (lbs) | 7 | 8 | 4 | 11 | 14 | 5 | 27 | 31 | 0 |
| | Load for 3/4 diam. needle (lbs) | 44 | 47 | 31 | 53 | 62 | 35 | >100 | >100 | 18 |

*Polyvinyl acetate was dissolved in methyl methacrylate and then emulsified.

EXAMPLE 8

In a manner similar to that described in Example 6, 2700 g of sand which had previously been incorporated with a given monomer dispersion at room temperature were charged into a glass cylindrical mold of 10 cm in diameter and 10.7 cm in height and pressed in 3 layers, with each layer being pressed 25 times by a 2.5 kg rammer. After leaving the samples for 1 day, the released samples were left for 6 days in a moist chamber at room temperature, then dipped into water for 24 hours at normal temperature and finally subjected to a one-axis compression test. The results of test are shown in Table 6.

Table 6

| Sample No. | 8-1 | 8-2 | 8-3 | 8-4 | 8-5 | 8-6 |
|---|---|---|---|---|---|---|
| Sand used | Mountain sand (a) | Mountain sand (a) | Mountain sand (a) | Mountain sand (a) | Loam (b) | Loam (b) |
| Sand | 2700 | 2700 | 2700 | 2700 | 2500 | 2700 |
| Methyl acrylate | 64 | — | — | — | — | — |
| Methyl methacrylate | — | — | 80 | — | 60 | 140 |
| Glycidyl methacrylate | — | — | — | — | — | 20 |
| Acrylic acid | — | — | — | — | 20 | — |
| Acrylonitrile | — | — | — | 40 | — | — |
| Styrene | 64 | — | — | 20 | — | — |
| Divinylbenzene | 32 | — | — | — | — | — |
| Vinyl acetate | — | 120 | — | — | — | — |
| 1-N Aqueous sulfurous acid | 80 | 80 | 80 | 80 | 120 | 80 |
| Polyethyleneglycol alkyl ether | 1.0 | 0.5 | — | 0.5 | — | — |
| Polybutadiene | — | — | — | 20 | — | — |
| Potassium persulfate | — | — | 0.5 | — | — | — |
| Blast furnace slug | — | — | — | — | 200 | — |
| Compression strength $q_\mu$ (kg/cm²) | 13 | 15 | 9.5 | 8.2 | 18 | 43 |

(a) Produced in Itokawa, Koito-machi, Kimitsu-gun, Chiba-ken, Japan
(b) Kanto loam

EXAMPLE 9

An emulsion was prepared by adding 150 g of polyvinyl acetate and 3.0 g of polyethyleneglycol alkyl ether to 220 g of water. The emulsion was mixed with 1.0 kg of 3% aqueous sulfurous acid and 350 g of methyl methacrylate and the mixture was stirred for 5 minutes by the aid of a mixer of 3000 rpm to obtain an earth stabilizing composition.

Within 1 minute, the composition was evenly sprinkled onto sandy ground sectioned to have an area of 1.0 m × 1.0 m (a reclaimed land in the suburbs of Shiogama-shi, Miyagi-ken, Japan). Two minutes after the sprinkling, elevation of the earth temperature of about 1° C was observed at a depth of 5 cm from the surface.

After lapse of 10 days, a test according to a Proctor penetration resistance test was performed whereby the measured value was 33 pounds for a needle of 1/5 inch diameter. The measured value in an untreated area was 0 pound.

The same result was obtained when the test was repeated using 4.5% aqueous solution of sodium bisulfite in place of an equal amount of 3% aqueous sulfurous acid.

EXAMPLE 10

A polymeric emulsion comprising 150 g of polyvinyl acetate and 700 g of water and a solution comprising 1.0 kg of 3.0% aqueous sulfurous acid and 350 g of methyl methacrylate were prepared separately. Onto the same sandy ground as described in Example 9, the latter mentioned solution was first sprinkled within one minute and then the first mentioned polymeric emulsion was sprinkled within 1 additional minute. After lapse of 10 days, the result of the injection needle testing method was 25 pounds for a needle of 1/5 inch diameter.

What is claimed is:

1. A composition for impregnating and reinforcing mineral masses by in situ polymerization therein which is stable against polymerization until contacted with said mineral mass, said composition being formed of a liquid mixture consisting essentially of at least one radical polymerizable liquid monomer selected from the group consisting of methyl acrylate, methyl methacrylate, and glycidyl methacrylate and an amount of a bisulfite ion-supplying substance which is within the range of about 0.001–50 parts, calculated as $SO_2$, per 100 parts by weight of monomer and sufficient to effect polymerization of said monomeric ester upon contact with said mineral mass.

2. The composition of claim 1 wherein said bisulfite ion-supplying substance is an aqueous solution of sulfurous acid and said monomer is dispersed in said solution.

* * * * *